(12) United States Patent
Huang

(10) Patent No.: US 7,558,693 B2
(45) Date of Patent: Jul. 7, 2009

(54) AUTOMATIC TEST METHOD AND APPARATUS USING THE SAME

(75) Inventor: Teng-Hsien Huang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 194 days.

(21) Appl. No.: 11/782,326

(22) Filed: Jul. 24, 2007

(65) Prior Publication Data

US 2009/0030642 A1    Jan. 29, 2009

(51) Int. Cl.
   *G01M 19/00*    (2006.01)
(52) U.S. Cl. .................. 702/113; 72/15.1; 72/16.1; 72/20.1; 72/405.13
(58) Field of Classification Search .................. 702/113, 702/185; 72/15.1, 30.1, 17.2, 20.1, 1, 405.16, 72/405.13, 16.1, 446, 448, 404; 700/206, 700/185, 178; 83/530; 483/1; 425/135; 100/214, 35
See application file for complete search history.

(56) References Cited

U.S. PATENT DOCUMENTS

| | | | | |
|---|---|---|---|---|
| 4,676,090 A | * | 6/1987 | Nishimura et al. ............. | 72/404 |
| 5,419,169 A | * | 5/1995 | Kirii ........................... | 72/16.1 |
| 5,540,073 A | * | 7/1996 | Kirii ........................... | 72/15.1 |
| 5,692,404 A | * | 12/1997 | Kirii et al. .................... | 72/15.1 |
| 5,692,405 A | * | 12/1997 | Kirii ........................... | 72/16.1 |
| 5,724,843 A | * | 3/1998 | Kirii et al. .................... | 72/17.2 |
| 5,970,763 A | * | 10/1999 | Takayama ........................ | 72/1 |
| 6,202,290 B1 | * | 3/2001 | Kewitz et al. .................. | 29/701 |
| 6,845,646 B2 | * | 1/2005 | Goto ........................... | 72/20.1 |
| 2008/0295564 A1 | * | 12/2008 | Kaneko et al. ........... | 72/405.13 |

* cited by examiner

Primary Examiner—Carol S Tsai
(74) Attorney, Agent, or Firm—WPAT, P.C.; Anthony King

(57) ABSTRACT

The present invention provides an automatic test method and an apparatus using the same for testing functions of a product by automatically pressing keys of the product. The automatic test method includes the steps of: inputting motion parameters of at least two driven mechanisms into a microcomputer; producing pulse waves by a motion control card disposed in the microcomputer after the microcomputer handling the motion parameters of the driven mechanisms; leading at least one touch head to move along a first direction and a second direction perpendicular with the first direction until the touch head being above the key of the product by the driven mechanisms after receiving the pulse waves; and pressing the key to test the function of the product through depressing the touch head.

7 Claims, 2 Drawing Sheets

AUTOMATIC TEST METHOD AND APPARATUS USING THE SAME

BACKGROUND OF THE INVENTION

1. Field of the Invention

The present invention relates to an automatic test method and an apparatus using the same, and more particularly to an automatic test method and an apparatus using the same capable of substituting for human to test functions of a product by automatically pressing keys of the product.

2. The Related Art

Generally speaking, testing functions of a product is in an important part of total quality assurance operations in the product manufacturing process. Conventionally, a method to test the product is that a tester presses keys of the product and sees if the function characteristics of the product get up to initializations which are shown on a microcomputer. However, some kinds of products, such as vehicle audios, air conditioners with constant temperature and so on, have many different keys. The tester has to waste much time to be familiar with the keys in order to do exact operations. Usually, the product is manufactured in a large scale. The tester has to test the product one by one. Because the workload is too large, sometimes the tester does a wrong press, leading the test data to be wrong, and then the outputs of the product are reduced. What is more, the materials which are made into the product are wasted.

Besides the test method described above, an immobile pneumatic device is used to test the product. But the structure of the immobile pneumatic device is too complex and the manufacture cost is too high. Further more, the immobile pneumatic device can just test a single kind of product. Therefore, the immobile pneumatic device does not adapt to a popular usage.

SUMMARY OF THE INVENTION

Accordingly, an object of the present invention is to provide an automatic test method and an apparatus using the same for testing functions of a product by automatically pressing keys of the product. The automatic test method includes the steps of: inputting motion parameters of at least two driven mechanisms into a microcomputer; producing pulse waves by a motion control card disposed in the microcomputer after the microcomputer handling the motion parameters of the driven mechanisms; leading at least one touch head to move along a first direction and a second direction perpendicular with the first direction until the touch head being above the key of the product by the driven mechanisms after receiving the pulse waves; and pressing the key to test the function of the product through depressing the touch head.

It can be seen that the automatic test method makes full use of the microcomputer to control the motions of the driven mechanisms, then the driven mechanisms lead the touch head move until the touch head is moved above the key of the product. Depress the touch head to press the key of the product, thereby to accomplish the function test of the product. The automatic test method substitutes for human to test the product and improves the accuracy of the test. Further more, the automatic test method can test different kinds of products having similar identities.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
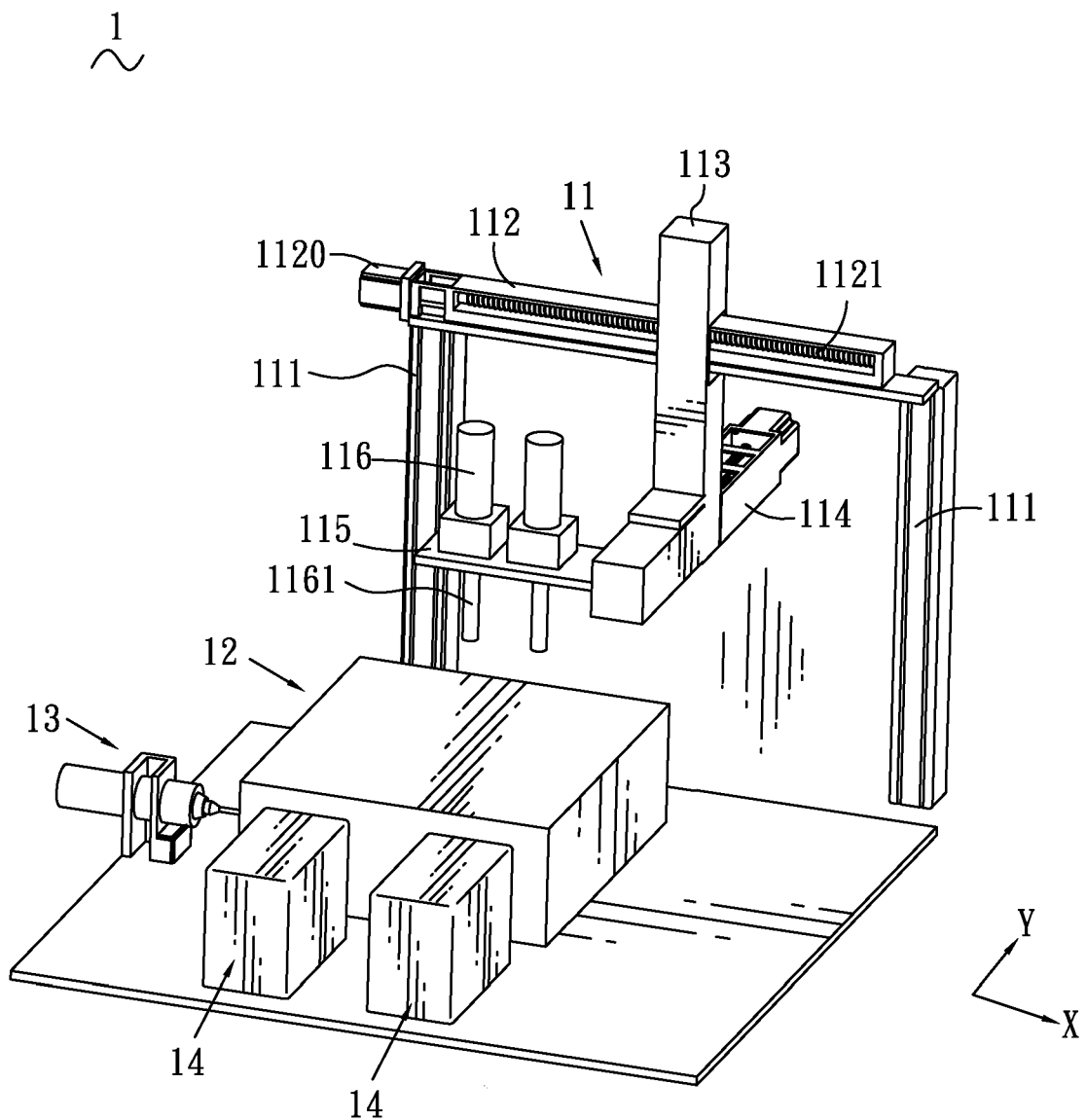
FIG. 1 is a perspective view of an apparatus using an automatic test method of the present invention.

Referring to FIG. 1, an apparatus 1 using an automatic test method to test different functions of a product in accordance with the present invention includes a worktable 11, a fixed table 12, a pen-shaped cylinder 13, and a pair of probe-shaped cylinders 14. The worktable 11 provides a pair of supporting members 111 which are parallel with each other. A rectangular rail 112 extends transversely and both ends of the rail 112 are fixed on tops of the two supporting members 111 respectively. The extending direction of the rail 112 defines a first direction designated X. The rail 112 is hollow and the side of the rail 112 facing to the fixed table 12 communicates with outside. One end of the rail 112 disposes a step motor 1120. The axle center of the step motor 1120 mounts a rotate shaft 1121. The surface of the rotate shaft 1121 defines screw threads. The rotate shaft 1121 passes through the end of the rail 112 and is located in the rail 112 pivotly.

A pensile shaft 113 matches with the rail 112 perpendicularly. The pensile shaft 113 defines thread recesses to couple with the screw threads of the rotate shaft 1121. When the step motor 1120 is started to work, the step motor 1120 leads the rotate shaft 1121 rotate and the rotate shaft 1121 further brings the pensile shaft 113 to move on the rail 112 back and forth along the X direction.

The lower end of the pensile shaft 113 connects with a fixed arm 114 extending longitudinally and perpendicularly with the rail 112. The extending direction of the fixed arm 114 defines a second direction designated Y. The fixed arm 114 is hollow and has substantially the same structure as the rail 112. The fixed arm 114 includes a step motor disposed on an end of thereof and a rotate shaft having screw threads on the surface thereof. The same structure between the fixed arm 114 and the rail 112 will not be described hereon.

A supporting board 115 coupled perpendicularly with the fixed arm 114 defines thread recesses on one side to engage with the screw threads of the rotate shaft disposed in the fixed arm 114 pivotly. Then, when the step motor is started to work, the step motor brings the rotate shaft to rotate, and the rotate shaft further brings the supporting board 115 to move on the fixed arm 114 back and forth along the Y direction. A pair of air-pressure cylinders 116 is located on the supporting board 115 in a row. The air-pressure cylinder 116 has a touch head 1161 passing through the supporting board 115 and extending downward. The fixed table 12 is arranged below the touch heads 1161 for loading the product that needs to be tested.

The probe-shaped cylinders 14 including a probe are set in front of the fixed table 12 abreast. When the product is tested, the touch heads 1161 of the air-pressure cylinders 116 are moved above different keys of the product. Depress the air-pressure cylinders 116 and the touch heads 1161 press the keys of the product. Because the keys connect to an input of a circuit assembled in the product, when the touch heads 1161 press the keys, an output of the circuit produces function signals. Press the probe-shaped cylinders 14 and the probes move forward to touch the output and test the function signals of the product. One side of the fixed table 12 disposes the pen-shaped cylinder 13 which has a penpoint coated with lacquer. When the function signals are up to standard, that is, the product is a good product, press the pen-shaped cylinder 13 and make the penpoint thereof to mark the good product for distinguishing the good product from faulted products easily.

Figure 2:
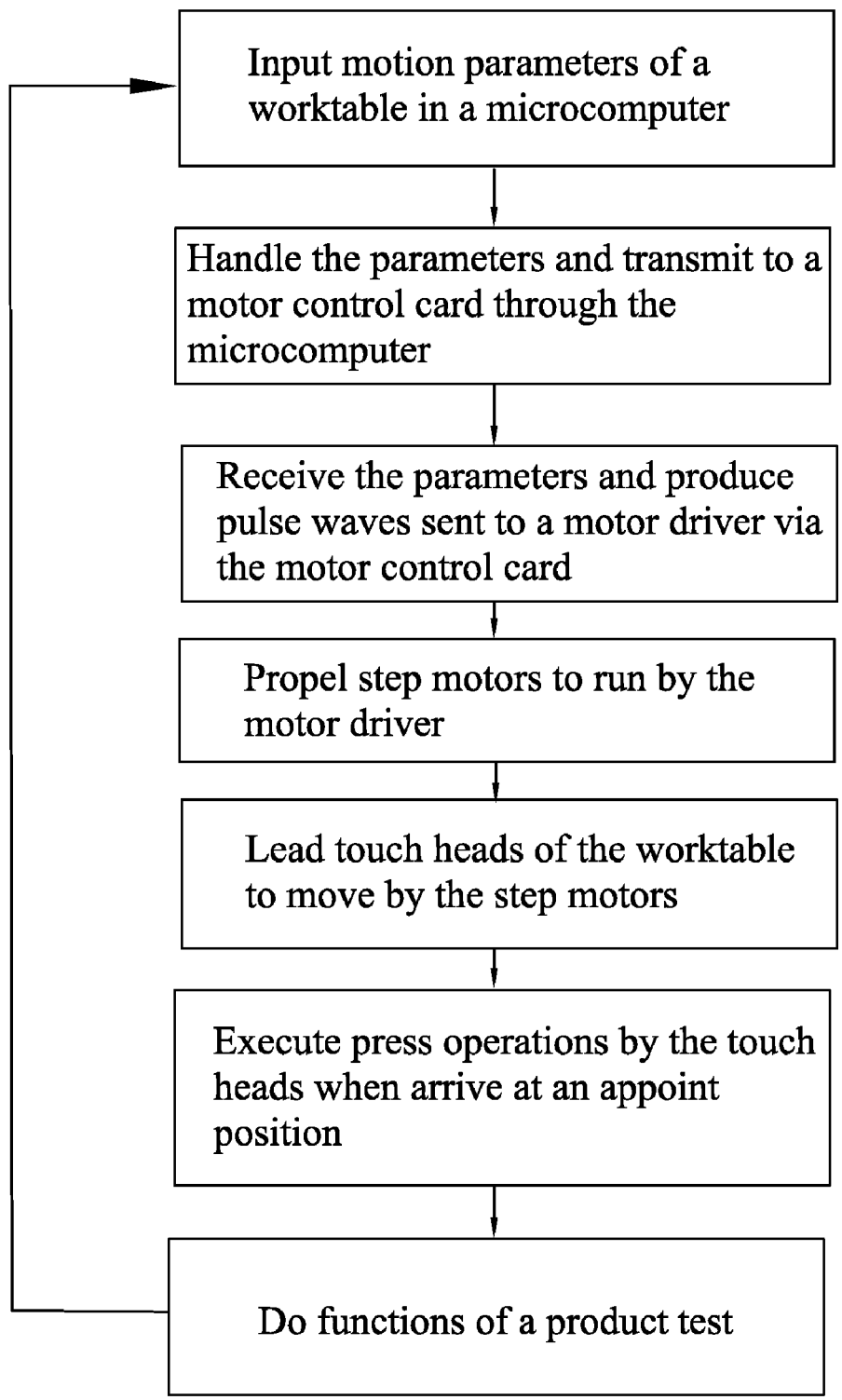
FIG. 2 is a flow chart of the automatic test method.

With reference to FIG. 2 showing the flow chart of the automatic test method according to the present invention, the method to test the product is illustrated as follows: First, input motion parameters of the worktable 11 in a microcomputer including a PCI (Peripheral Component Interconnect) and running a Labview software. The motion parameters include positions of the pensile shaft 113 and supporting board 115, motion speeds and motion accelerations of the pensile shaft 113 and supporting board 115 along the X direction and the Y direction respectively. After then, the Labview software handles the parameters and transmits the results to a motor control card which is inserted in an expansion slot of the PCI of the microcomputer. The motor control card receives the results and produces corresponding pulse waves which are sent to two motor drivers in sequence. One motor driver propels the step motor 1120 disposed on the rail 112 to run after receiving the pulse waves. The step motor 1120 brings the rotate shaft 1121 to rotate and the rotate shaft 1121 further brings the pensile shaft 113 to move back and forth along the X direction. The other motor driver propels the step motor disposed on the fixed arm 114 to run. The step motor brings the rotate shaft to rotate and the rotate shaft further brings the supporting board 115 to move back and forth along the Y direction until the touch heads 1161 of the air-pressure cylinders 116 are moved above the keys of the product. Then press down the air-pressure cylinders 116 and make the touch heads 1161 press the keys of the product to test the functions of the product by using the probe-shaped cylinders 14. If the product is up to standard, press the pen-shaped cylinder 13 to mark the good product in order to distinguish the good product from faulted products easily.

As described above, the automatic test method makes full use of the Labview software to control the motions of the step motors, then the step motors lead the pensile shaft 113 move back and forth along the X direction and the supporting board 115 to move back and forth along the Y direction until the touch heads 1161 of the air-pressure cylinders 116 are moved above the keys of the product. Press down the air-pressure cylinders 116 and make the touch heads 1161 press the keys of the product, thereby to accomplish the functions test of the products. The automatic test method substitutes for human to test the product and improves the accuracy of the test. Further more, the automatic test method can test different kinds of products having similar identities. The structure of the apparatus using the automatic test method is simplified and the manufacture cost is reduced.

Additionally, in the preferred embodiment, the pensile shaft 113 and the supporting board 115 are driven by the step motors to move back and forth along the X direction and the Y direction respectively. Besides the step motors, other driven mechanisms can also drive the pensile shaft 113 and the supporting board 115 to move. For example, one method is to dispose coils on the rail 112 and the fixed arm 114 respectively, and correspondingly dispose magnets on the pensile shaft 113 and the supporting board 115, utilizing the electromagnetic induction to drive the pensile shaft 113 and the supporting board 115 to move. Another method is employed piezoelectricity effect to drive the pensile shaft 113 and the supporting board 115 to move.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An automatic test method for testing functions of a product by automatically pressing keys of the product, comprising the steps of:
   inputting motion parameters of at least two driven mechanisms into a microcomputer;
   producing pulse waves by a motion control card disposed in the microcomputer after the microcomputer handling the motion parameters of the driven mechanisms;
   leading at least one touch head to move along a first direction and a second direction perpendicular with the first direction until the touch head being above the key of the product by the driven mechanisms after receiving the pulse waves; and
   pressing the key to test the function of the product through depressing the touch head.

2. The automatic test method as claimed in claim 1, wherein the microcomputer runs a kind of software to handle the motion parameters of the driven mechanisms.

3. An apparatus using an automatic test method, comprising a worktable disposing at least two driven mechanisms and including two supporting members which are parallel with each other, a rail extending outward and both ends of the rail fixed on tops of the two supporting members respectively, one of the driven mechanisms arranged on the rail, a pensile shaft matching with the rail and a fixed arm connecting with the pensile shaft perpendicularly with the rail, another driven mechanism located on the fixed arm, a supporting board coupled perpendicularly with the fixed arm, a touch head passing through the supporting board and extending downward.

4. The apparatus using an automatic test method as claimed in claim 3, wherein the driven mechanism disposed on the rail includes a step motor, the axle center of the step motor mounts a rotate shaft passing through the rail and located in the rail pivotly, the rotate shaft couples with the pensile shaft spirally, the driven mechanism disposed on the fixed arm has the same structure as the driven mechanism disposed on the rail, and a rotate shaft matches with the supporting board spirally.

5. The apparatus using an automatic test method as claimed in claim 3, further comprising a pair of air-pressure cylinders located on the supporting board in a row, the air-pressure cylinder having a touch head passing through the supporting board and extending downward.

6. The apparatus using an automatic test method as claimed in claim 3, further comprising a fixed table arranged below the touch head for loading a product which needs to be tested.

7. The apparatus using an automatic test method as claimed in claim 3, wherein one side of the fixed table disposes a pen-shaped cylinder which has a penpoint coated with lacquer for marking a good product.

\* \* \* \* \*